(12) United States Patent
Liang

(10) Patent No.: US 12,442,382 B2
(45) Date of Patent: Oct. 14, 2025

(54) FORWARD AND REVERSE ROTATION FAN

(71) Applicant: GUANGDONG TCOMAS TECHNOLOGY CO., LTD, Guangdong (CN)

(72) Inventor: Zhenzhi Liang, Guangdong (CN)

(73) Assignee: GUANGDONG TCOMAS TECHNOLOGY CO., LTD, Huizhou (CN)

( * ) Notice: Subject to any disclaimer, the term of this patent is extended or adjusted under 35 U.S.C. 154(b) by 0 days.

(21) Appl. No.: 18/828,062

(22) Filed: Sep. 9, 2024

(65) Prior Publication Data

US 2025/0101990 A1   Mar. 27, 2025

(30) Foreign Application Priority Data

Sep. 21, 2023   (CN) .......................... 202322572261.8

(51) Int. Cl.
| | | |
|---|---|---|
| *F04D 27/00* | (2006.01) | |
| *F04D 25/06* | (2006.01) | |
| *F04D 29/52* | (2006.01) | |
| *H02K 11/28* | (2016.01) | |

(52) U.S. Cl.
CPC ......... *F04D 27/00* (2013.01); *F04D 25/0693* (2013.01); *F04D 29/522* (2013.01); *H02K 11/28* (2016.01)

(58) Field of Classification Search
CPC .... F04D 27/00; F04D 25/0693; F04D 29/522; F04D 29/646; F04D 19/005; F04D 25/08; H02K 11/28
See application file for complete search history.

(56) References Cited

U.S. PATENT DOCUMENTS

| | | | | |
|---|---|---|---|---|
| 2008/0180911 A1* | 7/2008 | Kaneko | ................... | H02K 5/24 310/67 R |
| 2019/0249862 A1* | 8/2019 | Fan | ........................ | F21V 17/12 |
| 2019/0316769 A1* | 10/2019 | Fan | ............................ | F21V 3/02 |
| 2019/0331122 A1* | 10/2019 | Chen | ..................... | F04D 19/005 |
| 2020/0072231 A1* | 3/2020 | Huang | ................ | F04D 25/0613 |
| 2020/0116348 A1* | 4/2020 | Huang | ................ | F04D 25/0613 |
| 2023/0096473 A1* | 3/2023 | Murphy | ................ | F04D 29/601 108/33 |
| 2024/0369069 A1* | 11/2024 | Koshiba | ................ | F04D 25/068 |

FOREIGN PATENT DOCUMENTS

| | | | |
|---|---|---|---|
| CN | 200952492 Y | * | 9/2007 |
| JP | 2003294282 A | * | 10/2003 |

* cited by examiner

*Primary Examiner* — Matthew T Largi

(57) ABSTRACT

A forward and reverse rotation fan includes a fan body. The fan body is internally arranged with forward and reverse rotation fan blades, the forward and reverse rotation fan blades are sleeved at an upper portion of a forward and reverse rotation motor, the forward and reverse rotation motor is connected to a conductive flexible printed circuit (FPC) board, the conductive FPC board is connected to a power lead, a back face of the forward and reverse rotation motor is arranged with a forward and reverse rotation switch, and the forward and reverse rotation switch is connected to and controls a motor. According to the above technical solution, a fan can be controlled to rotate forward or in reverse by manually toggling the forward and reverse rotation switch, with convenience in use for requiring no disassembly, and the fan is very suitable for devices with limited space for mounting fans.

7 Claims, 3 Drawing Sheets

FORWARD AND REVERSE ROTATION FAN

CROSS-REFERENCE TO RELATED APPLICATION

This application claims priority of Chinese Patent Application No. 202322572261.8, filed on Sep. 21, 2023, the entire contents of which are incorporated herein by reference.

TECHNICAL FIELD

The present disclosure relates to the field of fans, and specifically to a forward and reverse rotation fan.

BACKGROUND

Fans are generally used for heat dissipation of radiators, chassis and other devices, and fan blades are rotated driven by a power supply to speed up air flow to enhance the efficiency of heat dissipation.

In the prior art, a fan of a radiator can only rotate in one direction. When a user needs to switch air inlet and outlet directions, the fan needs to be disassembled and mounted in reverse, with complex operation, sometimes failing to mount the fan in reverse due to limited space. What's worse, fan blades of an ordinary fan are asymmetric. When the fan blades rotate in reverse, air pressure and air volume are much lower than those in a forward rotation, with an undesirable effect in actual use.

SUMMARY

An objective of the present disclosure is to provide a forward and reverse rotation fan to overcome the shortcomings in the prior art.

The objective of the present disclosure is realized by the following technical solutions.

A forward and reverse rotation fan includes a fan body. The fan body is internally arranged with forward and reverse rotation fan blades, blade profiles on upper and lower sides of the forward and reverse rotation fan blades are symmetrical, and regardless of forward rotation or reverse rotation of a fan, air volume and air pressure driven by the forward and reverse rotation fan blades will not change. The forward and reverse rotation fan blades are sleeved at an upper portion of a forward and reverse rotation motor, and a rotation direction of the forward and reverse rotation motor controls forward and reverse rotation directions of the forward and reverse rotation fan blades. The forward and reverse rotation motor is connected to a conductive flexible printed circuit (FPC) board, and the conductive FPC board transmits power to the forward and reverse rotation motor to rotate the motor. The conductive FPC board is connected to a power lead, and the power lead transmits power to the conductive FPC board. A back face of the forward and reverse rotation motor is arranged with a forward and reverse rotation switch, and the forward and reverse rotation switch controls a rotation direction of a forward and reverse rotation fan. When the fan blades rotate counterclockwise, it is a forward rotation, and air enters from faces of the fan blades and is discharged from faces of fan frames; and when the fan blades rotate clockwise, it is a reverse rotation, and air enters form the faces of the fan frames and is discharged from the faces of the fan blades. The forward and reverse rotation switch is connected to and controls the motor, the forward and reverse rotation switch is connected to a plurality of contact points of a control circuit board of the motor, and by operating the forward and reverse rotation switch, the contact points are connected to different circuit paths to control a flow direction of a current, thereby changing a direction of a magnetic field of the motor, and thus changing a rotation direction of the fan.

In one example, an upper portion of the conductive FPC board is arranged with an interface terminal, and the interface terminal is connected to the forward and reverse rotation motor and other parts inside the fan that need power, to provide power for these parts; the interface terminal is electrically connected to the forward and reverse rotation motor, and the interface terminal transmits power from an external power supply to the forward and reverse rotation motor; one end of the conductive FPC board is arranged with a connecting male end, and the other end of the conductive FPC board is arranged with a connecting female end; and the connecting male end matches with the connecting female end, so that a plurality of fans can be communicated to be powered, requiring only one power lead to power all the parts that need power on the plurality of fans.

In one example, the motor is a single-phase asynchronous motor, which is an alternating current motor with only one input phase, and when the motor is used, the forward and reverse rotation switch switches a connection mode of a starting winding of the single-phase asynchronous motor, thereby changing a rotation direction of the motor.

In one example, the motor is a triple-phase asynchronous motor, which is powered by a three-phase power supply, and when the motor is used, the forward and reverse rotation switch is manually toggled to change high and low levels of a function pin in an integrated circuit (IC) to change a driving phase, thereby changing a rotation direction of the motor.

In one example, blade profiles on upper and lower sides of the forward and reverse rotation fan blades are symmetrical, the symmetrical blade profiles on the upper and lower sides keep air pressure and air volume driven by the forward rotation or reverse rotation of the fan consistent, so that the fan will not decrease in heat dissipation capacity due to different rotation directions.

In one example, the fan body includes an upper housing, a light guide ring, and a lower housing, the upper housing and the lower housing being combined from top to bottom to form a fan housing.

In one example, a bottom face of the lower housing is disposed with a switch notch, the switch notch is rectangular, and the switch notch matches with the forward and reverse rotation switch in size and position, so that a hand can pass through the switch notch to toggle the forward and reverse rotation switch.

In one example, the conductive FPC board is positioned on an outer side wall of the light guide ring, two ends of the conductive FPC board are exposed to two sides of the fan housing, and the light guide ring is electrically connected to the conductive FPC board; and the conductive FPC board transmits power from an external power supply to the light guide ring, so that the light guide ring can emit light.

In one example, the forward and reverse rotation motor includes a motor housing, a motor, and a motor bearing; the motor housing is internally arranged with the motor, and the motor converts electrical energy into mechanical energy; and the motor is internally arranged with the motor bearing for supporting a rotation shaft to reduce friction.

In one example, the power lead includes a lead connector, a connecting wire, and a power supply interface terminal; the lead connector is connected to the power supply interface terminal via the connecting wire; the lead connector is arranged with a lead female end to realize the transmission of power from an external power supply to the lead female end; and the lead female end matches with and is electrically connected to the connecting male end, and a circuit of the lead female end is transmitted to the forward and reverse rotation fan.

The present disclosure has the following advantageous effects.

In the present disclosure, according to the above technical solutions, the fan can be controlled to rotate forward or in reverse by manually toggling the forward and reverse rotation switch, with convenience in use for requiring no disassembly, and this fan is very suitable for devices with limited space for mounting fans; and the symmetrical blade profiles on the upper and lower sides of the fan keep the air pressure and air volume driven by the forward rotation or the reverse rotation of the fan consistent, and the fan will not decrease in heat dissipation capacity due to different rotation directions; and a user doesn't need to consider a heat dissipation power when using the fan, which is convenient in use.

BRIEF DESCRIPTION OF THE DRAWINGS

To describe the technical solutions in the examples of the present disclosure more clearly, the accompanying drawings required in the examples are briefly described below. It is to be understood that the accompanying drawings in the following description show merely some examples of the present disclosure, and are not to be deemed as limiting the scope. Those of ordinary skill in the art can also derive other accompanying drawings from these accompanying drawings without creative efforts.

Figure 1:
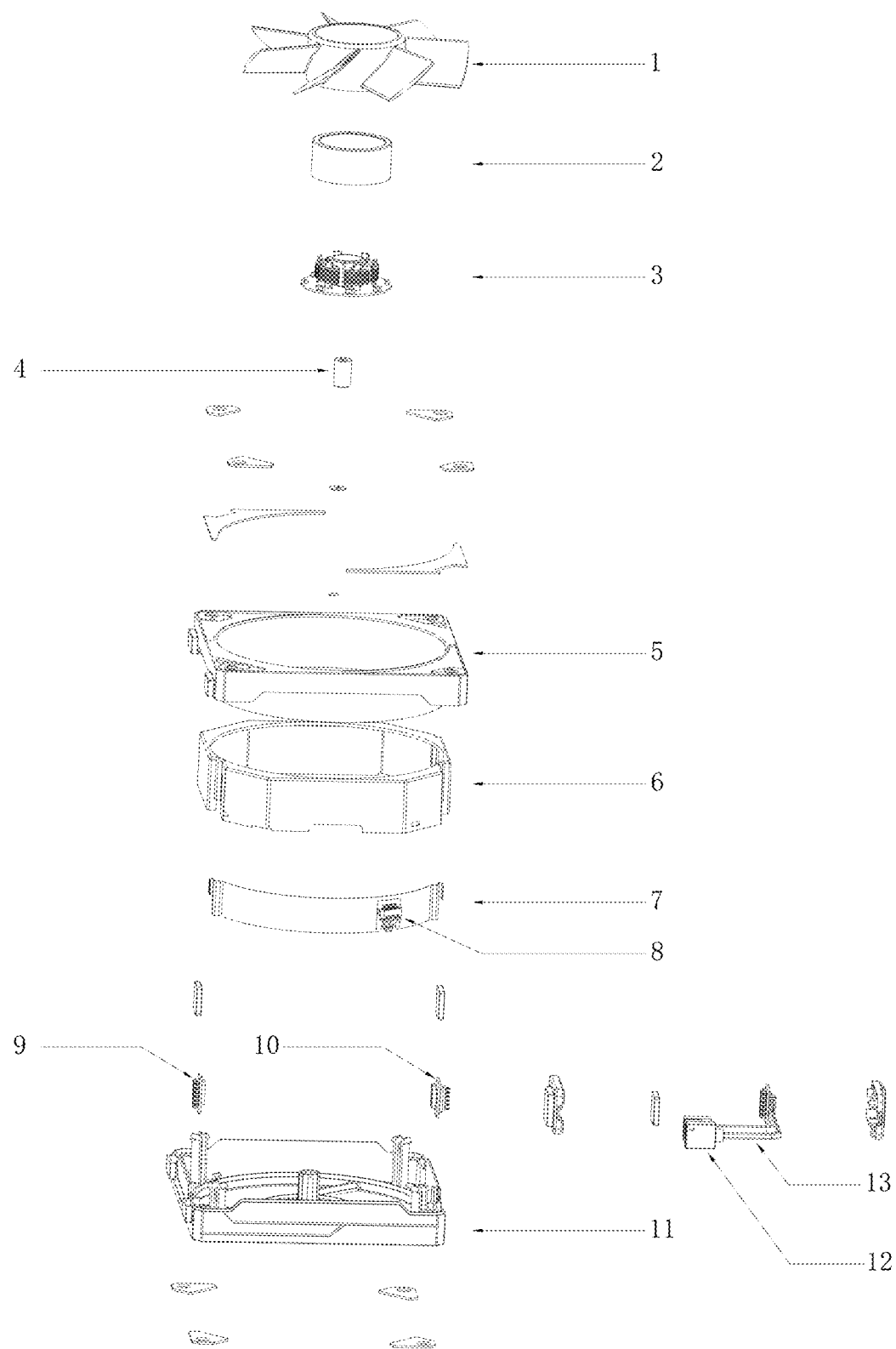
FIG. 1 is an exploded view of the present disclosure.

Reference numerals and denotations thereof: 1—forward and reverse rotation fan blade, 2—motor housing, 3—motor, 4—motor bearing, 5—upper housing, 6—light guide ring, 7—conductive FPC board, 8—interface terminal, 9—connecting female end, 10—connecting male end, 11—lower housing, 12—power supply interface terminal, 13—connecting wire, 14—lead connector, 15—lead female end, and 16—forward and reverse rotation switch.

DETAILED DESCRIPTION

For the ease of understanding the present disclosure, the present disclosure will be described more comprehensively by reference to the related drawings below. Preferred embodiments of the present disclosure are provided in the accompanying drawings. However, the present disclosure can be realized in various forms and is not limited to the embodiments described herein. These embodiments are provided for making the disclosure of the present disclosure more thorough and comprehensive.

It is to be noted that when an element is "fixed" to another element, it can be directly fixed to another element, or fixed to another element via a middle element. When an element is "connected to" another element, it can be connected to another element directly, or connected to another element via a middle element. The terms "vertical", "horizontal", "left", "right" and similar expressions used herein are merely illustrative and are not intended to be a sole embodiment.

Unless otherwise specified, all technical and scientific terms used herein have the same meaning as those generally understood by those ordinary skilled in the art to which the present disclosure belongs. The terms used in the specification of the present disclosure are merely intended to describe the specific embodiments, and are not to be deemed as limiting the present disclosure. The term "and/or" includes any and all combinations of one or more related listed items.

Figure 2:
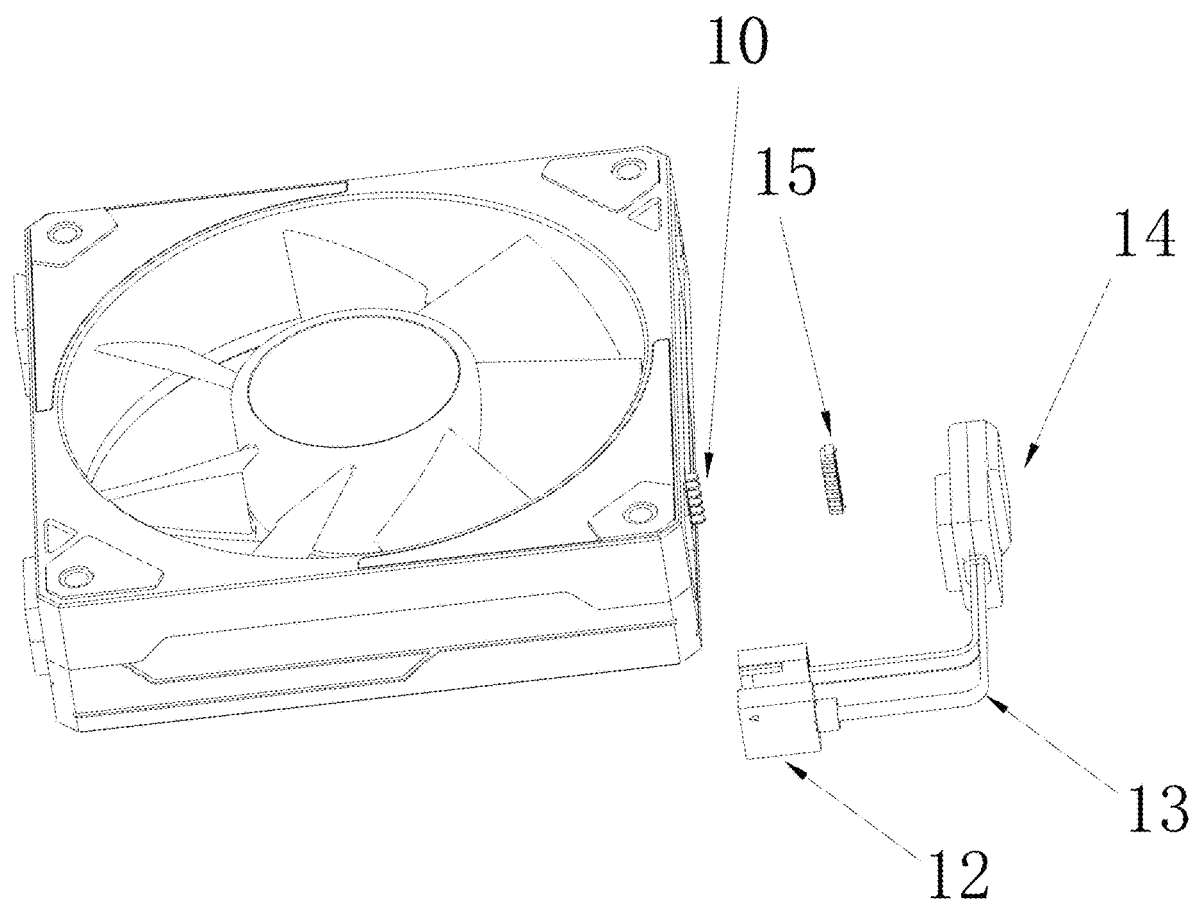
FIG. 2 is a schematic diagram of the present disclosure.
Figure 3:
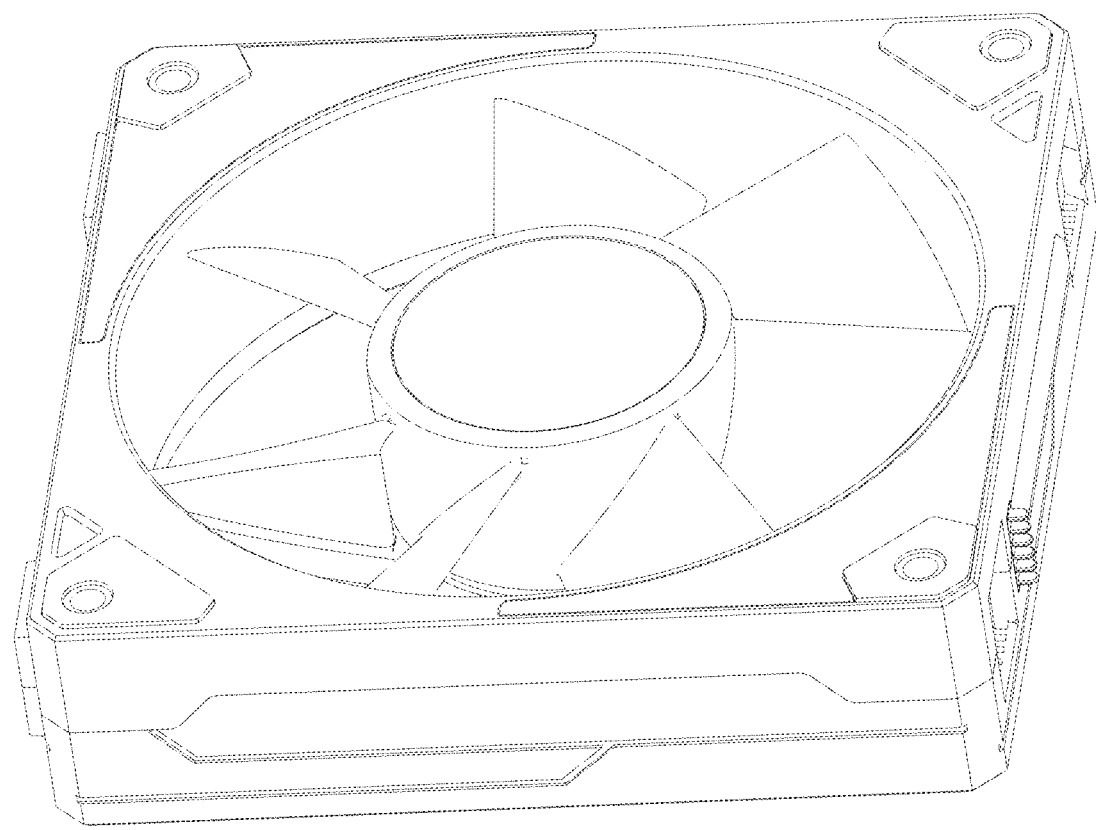
FIG. 3 is a perspective view of the present disclosure.
Figure 4:
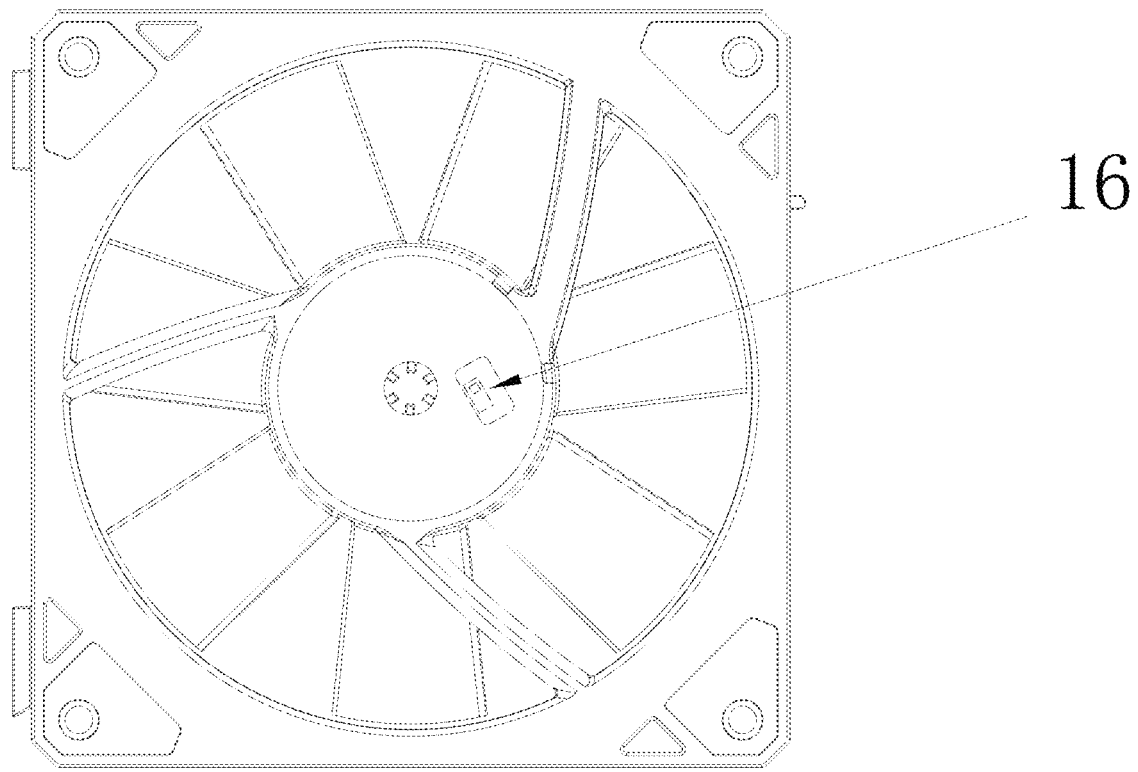
FIG. 4 is a bottom view of the present disclosure.

Examples of the present disclosure are shown in FIGS. 1 to 4.

A forward and reverse rotation fan includes a fan body. The fan body is internally arranged with forward and reverse rotation fan blades 1, the forward and reverse rotation fan blades 1 are sleeved at an upper portion of a forward and reverse rotation motor, the forward and reverse rotation motor is connected to a conductive FPC board 7, the conductive FPC board 7 is connected to a power lead, a back face of the forward and reverse rotation motor is arranged with a forward and reverse rotation switch 16, and the forward and reverse rotation switch 16 is connected to and controls a motor 3.

According to the above technical solution, blade profiles on upper and lower sides of the forward and reverse rotation fan blades 1 inside the main body of a forward and reverse rotation fan are symmetrical, and regardless of forward rotation or reverse rotation of the fan, air volume and air pressure driven by the forward and reverse rotation fan blades 1 will not change, and the forward and reverse rotation fan blades 1 sleeved at the upper portion of the forward and reverse rotation motor rotate along with a rotation direction of the forward and reverse rotation motor; the forward and reverse rotation motor is connected to the conductive FPC board 7, and the conductive FPC board 7 transmits power to the forward and reverse rotation motor to rotate the motor 3; the power lead transmits power to the connected conductive FPC board 7; the forward and reverse rotation switch 16 on the back face of the forward and reverse rotation motor controls a rotation direction of the forward and reverse rotation fan; when the fan blades rotate counterclockwise, it is a forward rotation, and air enters from faces of the fan blades and is discharged from faces of fan frames; when the fan blades rotate clockwise, it is a reverse rotation, and air enters form the faces of the fan frames and is discharged from the faces of the fan blades; and the forward and reverse rotation switch 16 is connected to a plurality of contact points of a control circuit board of the motor 3, and by operating the forward and reverse rotation switch 16, the contact points are connected to different circuit paths to control a flow direction of a current, thereby changing a direction of a magnetic field of the motor, and thus changing a rotation direction of the fan.

Preferably, an upper portion of the conductive FPC board 7 is arranged with an interface terminal 8, and the interface terminal 8 is electrically connected to the forward and reverse rotation motor; and one end of the conductive FPC board 7 is arranged with a connecting male end 10, and the other end of the conductive FPC board 7 is arranged with a connecting female end 9, the connecting male end 10 matching with the connecting female end 9.

According to the above technical solution, the interface terminal 8 at the upper portion of the conductive FPC board 7 is connected to the forward and reverse rotation motor and other parts inside the fan that need power, to provide power for these parts; the interface terminal 8 transmits power from an external power supply to the forward and reverse rotation motor; one end of the conductive FPC board 7 is arranged with the connecting male end 10, and the other end of the conductive FPC board 7 is arranged with the connecting female end 9; and the connecting male end 10 matches with the connecting female end 9, so that a plurality of fans can be communicated to be powered, requiring only one power lead to power all the parts that need power on the plurality of fans.

Preferably, the electric motor 3 is a single-phase asynchronous motor.

According to the above technical solution, the single-phase asynchronous motor is an alternating current motor with only one input phase, and when the motor is used, the forward and reverse rotation switch 16 switches a connection mode of a starting winding of the single-phase asynchronous motor, thereby changing a rotation direction of the motor.

Preferably, the electric motor 3 is a triple-phase asynchronous motor.

According to the above technical solution, the triple-phase asynchronous motor is powered by a three-phase power supply, and when the motor is used, the forward and reverse rotation switch 16 is manually toggled to change the connection of two phases of the motor, so that a phase difference of currents is changed, thereby changing a rotation direction of the motor.

Preferably, blade profiles on upper and lower sides of the forward and reverse rotation fan blades 1 are symmetrical.

According to the above technical solution, the symmetrical blade profiles on the upper and lower sides keep air pressure and air volume driven by the forward rotation or the reverse rotation of the fan consistent, so that the fan will not decrease in heat dissipation capacity due to different rotation directions.

Preferably, the fan body includes an upper housing 5, a light guide ring 6, and a lower housing 11, the upper housing 5 and the lower housing 11 being combined from top to bottom to form a fan housing.

According to the above technical solution, the upper housing 5 and the lower housing 11 are combined from top to bottom to form the fan housing to protect the fan blades from being deformed or loosened by impact, and the light guide ring 6 can limit light to make the fan more beautiful.

Preferably, a bottom face of the lower housing 11 is disposed with a switch notch, and the switch notch matches with the forward and reverse rotation switch 16 in size and position.

According to the above technical solution, the switch notch on the bottom face of the lower housing 11 is rectangular, and the switch notch matches with the forward and reverse rotation switch 16 in size and position, so that a hand can pass through the switch notch to toggle the forward and reverse rotation switch 16.

Preferably, the conductive FPC board 7 is positioned on an outer side wall of the light guide ring 6, two ends of the conductive FPC board 7 are exposed to two sides of the fan housing, and the light guide ring 6 is electrically connected to the conductive FPC board 7.

According to the above technical solution, the conductive FPC board 7 on the outer side wall of the light guide ring 6 transmits power from an external power supply to the light guide ring 6, so that the light guide ring 6 can emit light to enhance the aesthetics.

Preferably, the forward and reverse rotation motor includes a motor housing 2, the motor 3, and a motor bearing 4, the motor housing 2 being internally arranged with the motor 3, and the motor 3 being internally arranged with the motor bearing 4.

According to the above technical solution, the motor 3 inside the motor housing 2 converts electrical energy into mechanical energy, and the motor bearing 4 serves to support a rotation shaft to reduce friction.

Preferably, the power lead includes a lead connector 14, a connecting wire 13, and a power supply interface terminal 12, the lead connector 14 being connected to the power supply interface terminal 12 via the connecting wire 13, the lead connector 14 being arranged with a lead female end 15, and the lead female end 15 matching with and being electrically connected to the connecting male end 10.

According to the above technical solution, the lead connector 14 is connected to the power supply interface terminal 12 via the connecting wire 13; the lead connector 14 is arranged with the lead female end 15 to realize the transmission of power from an external power supply to the lead female end 15; and the lead female end 15 matches with and is electrically connected to the connecting male end 10, and a circuit of the lead female end 15 is transmitted to the forward and reverse rotation fan.

A working principle is as follows. By toggling the forward and reverse rotation switch 16, the contact points are connected to different circuit paths, and the flow direction of the current is changed, so that the direction of the magnetic field of the motor is changed, thus changing the rotation direction of the fan.

During mounting, the power supply interface terminal 12 is connected to an interface of an external power supply, the lead connector 14 is connected to a first forward and reverse rotation fan, and according to demand, the forward and reverse rotation switch 16 is toggled to control the fan to be in the forward or reverse rotation state, to complete the mounting.

The above-described examples are merely several embodiments of the present disclosure, which are described in a more specific and detailed manner, but are not to be construed as a limitation on the scope of the present disclosure. It is to be noted that for those ordinary skilled in the art, several deformations and improvements can be made without departing from the conception of the present disclosure, all of which fall within the scope of protection of the present disclosure. Therefore, the scope of protection of the present disclosure is to be defined by the attached claims.

The invention claimed is:

1. A forward and reverse rotation fan, comprising:
a fan body, wherein the fan body is internally arranged with forward and reverse rotation fan blades, the forward and reverse rotation fan blades are sleeved at an upper portion of a forward and reverse rotation motor, the forward and reverse rotation motor is connected to a conductive flexible printed circuit (FPC) board, the conductive FPC board is connected to a power lead, a back face of the forward and reverse rotation motor is arranged with a forward and reverse rotation switch, and the forward and reverse rotation switch is connected to and controls a motor;
the fan body comprises an upper housing, a light guide ring, and a lower housing, the upper housing and the lower housing being combined from top to bottom to form a fan housing; and
the conductive FPC board is positioned on an outer side wall of the light guide ring, two ends of the conductive FPC board are exposed to two sides of the fan housing, and the light guide ring is electrically connected to the conductive FPC board;
wherein an upper portion of the conductive FPC board is arranged with an interface terminal, and the interface terminal is electrically connected to the forward and reverse rotation motor; one end of the conductive FPC board is arranged with a connecting male end, the other end of the conductive FPC board is arranged with a connecting female end, and the connecting male end matching with the connecting female end.

2. The forward and reverse rotation fan according to claim 1, wherein the motor is a single-phase asynchronous motor.

3. The forward and reverse rotation fan according to claim 1, wherein the motor is a triple-phase asynchronous motor.

4. The forward and reverse rotation fan according to claim 1, wherein blade profiles on upper and lower sides of the forward and reverse rotation fan blades are symmetrical.

5. The forward and reverse rotation fan according to claim 1, wherein a bottom face of the lower housing is disposed with a switch notch, and the switch notch matches with the forward and reverse rotation switch in size and position.

6. The forward and reverse rotation fan according to claim 1, wherein the forward and reverse rotation motor comprises a motor housing, the motor, and a motor bearing, the motor housing being internally arranged with the motor, and the motor being internally arranged with the motor bearing.

7. The forward and reverse rotation fan according to claim 1, wherein the power lead comprises a lead connector, a connecting wire, and a power supply interface terminal, the lead connector being connected to the power supply interface terminal via the connecting wire, the lead connector being arranged with a lead female end, and the lead female end matching with and being electrically connected to the connecting male end.

* * * * *